(12) United States Patent  
Zhang et al.

(10) Patent No.: US 12,257,543 B2  
(45) Date of Patent: Mar. 25, 2025

(54) OIL-GAS TREATMENT SYSTEM, OIL-GAS TREATMENT METHOD AND MECHANICAL APPARATUS

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Jianwei Wang, Shandong (CN); Xiaolei Ji, Shandong (CN); Zhuqing Mao, Shandong (CN); Liang Lv, Shandong (CN); Xincheng Li, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 877 days.

(21) Appl. No.: 17/368,341

(22) Filed: Jul. 6, 2021

(65) Prior Publication Data

US 2022/0250000 A1     Aug. 11, 2022

(30) Foreign Application Priority Data

Feb. 9, 2021    (CN) .......................... 202110181987.1

(51) Int. Cl.
    *B01D 47/02*        (2006.01)
    *B01D 46/00*        (2022.01)
                 (Continued)

(52) U.S. Cl.
    CPC ....... *B01D 47/028* (2013.01); *B01D 46/0036* (2013.01); *B01D 46/442* (2013.01);
                 (Continued)

(58) Field of Classification Search
    CPC ............. B01D 47/028; B01D 46/0036; B01D 46/442; B01D 47/024; B01D 50/60;
                 (Continued)

(56) References Cited

U.S. PATENT DOCUMENTS

| | | | | |
|---|---|---|---|---|
| 4,666,473 A | * | 5/1987 | Gerdau | ................. B01D 46/24 184/6.16 |
| 4,880,449 A | * | 11/1989 | Babyak | .............. B01D 19/0063 210/104 |

(Continued)

FOREIGN PATENT DOCUMENTS

| CN | 201034154 Y | 3/2008 |
|---|---|---|
| CN | 101701776 A | 5/2010 |

(Continued)

OTHER PUBLICATIONS

Translation of CN211936210U, accessed May 8, 2024 (Year: 2020).*

(Continued)

*Primary Examiner* — Christopher P Jones  
*Assistant Examiner* — Phillip Y Shao  
(74) *Attorney, Agent, or Firm* — Crowell & Moring LLP

(57) ABSTRACT

An oil-gas treatment system, an oil-gas treatment method and a mechanical apparatus are disclosed. The oil-gas treatment system includes an oil-gas separation device and a first oil-gas delivery device. The oil-gas separation device is configured to perform an oil-gas separation treatment on oil-gas generated by an oil-gas generation device, the oil-gas separation device includes a lubrication oil box for containing lubrication oil; the first oil-gas delivery device is communicated with the lubrication oil box and is configured to convey at least a part of the oil-gas into the lubrication oil box; the lubrication oil box is configured to separate the oil-gas conveyed into the lubrication oil box, and a separated oil product is left in the lubrication oil box.

19 Claims, 7 Drawing Sheets

(51) Int. Cl.
  *B01D 46/44* (2006.01)
  *B01D 50/60* (2022.01)
  *B01D 53/00* (2006.01)
  *F02C 7/06* (2006.01)

(52) U.S. Cl.
  CPC .......... *B01D 47/024* (2013.01); *B01D 50/60* (2022.01); *B01D 53/002* (2013.01); *F02C 7/06* (2013.01); *F05D 2260/98* (2013.01)

(58) Field of Classification Search
  CPC .............. B01D 53/002; B01D 2247/04; B01D 2258/06; F02C 7/06; F05D 2260/98
  See application file for complete search history.

(56) References Cited

U.S. PATENT DOCUMENTS

| | | | | |
|---|---|---|---|---|
| 5,158,585 | A | * | 10/1992 | Saho ................. B01D 46/0036 55/437 |
| 5,564,401 | A | * | 10/1996 | Dickson ............... F01M 13/023 123/573 |
| 6,113,676 | A | * | 9/2000 | Kumpulainen .... B01D 19/0036 95/147 |
| 8,348,017 | B2 | * | 1/2013 | Dickie .................... F01D 25/20 184/6.28 |
| 8,672,095 | B2 | | 3/2014 | Charier et al. |
| 9,540,951 | B2 | | 1/2017 | Dos Santos et al. |
| 2002/0092874 | A1 | * | 7/2002 | Osterfeld ............. B05C 5/0208 222/402.1 |
| 2004/0065110 | A1 | * | 4/2004 | Barratt ................... F25B 43/02 62/503 |
| 2007/0277485 | A1 | * | 12/2007 | MacKenzie ........... B01D 45/08 55/424 |
| 2008/0179227 | A1 | * | 7/2008 | Saito .................. B01D 19/0057 210/512.1 |
| 2010/0187180 | A1 | * | 7/2010 | Baten ..................... B01D 45/08 60/39.08 |
| 2015/0040767 | A1 | * | 2/2015 | Sugio ..................... F04B 39/16 96/417 |
| 2015/0343356 | A1 | * | 12/2015 | Sugio ................... B01D 53/261 55/462 |
| 2016/0001758 | A1 | * | 1/2016 | Sugio ..................... F04B 39/16 55/426 |
| 2017/0016438 | A1 | * | 1/2017 | Fan ..................... F04B 39/0269 |
| 2020/0149448 | A1 | * | 5/2020 | P ........................... B01D 50/20 |

FOREIGN PATENT DOCUMENTS

| | | | |
|---|---|---|---|
| CN | 102538392 A | 7/2012 | |
| CN | 105065086 A | 11/2015 | |
| CN | 206191914 U | 5/2017 | |
| CN | 107120513 A | 9/2017 | |
| CN | 108949216 A | 12/2018 | |
| CN | 209270881 U | 8/2019 | |
| CN | 209866785 U | 12/2019 | |
| CN | 210715327 U | 6/2020 | |
| CN | 211936210 U | 11/2020 | |
| CN | 112081641 A * | 12/2020 | ............. F01M 13/00 |
| CN | 112832935 A | 5/2021 | |
| FR | 2926597 A1 | 7/2009 | |
| JP | 3909631 B2 | 4/2007 | |
| KR | 1020160019990 A | 2/2016 | |

OTHER PUBLICATIONS

Translation of CN112081641A, accessed May 8, 2024 (Year: 2020).*
International Search Report and Written Opinion mailed Nov. 5, 2021 for International Application No. PCT/CN2021/098896.

* cited by examiner

OIL-GAS TREATMENT SYSTEM, OIL-GAS TREATMENT METHOD AND MECHANICAL APPARATUS

TECHNICAL FIELD

Embodiments of the disclosure relate to an oil-gas treatment system, an oil-gas treatment method and a mechanical apparatus.

BACKGROUND

Some mechanical apparatuses need to combust fuel to provide power when working, and thus a lot of oil-gas or oil mist is generated in a combustion chamber. For example, the mechanical apparatuses comprise an internal-combustion engine such as a turbine engine. After the fuel in the mechanical apparatus combusts in the combustion chamber of the turbine engine, a lot of oil-gas or oil mist are generated, both the oil-gas and the oil mist are mixture of gas and tiny oil droplets. If the oil-gas and the oil mist are discharged directly into external environment through other structures of the mechanical apparatus, the oil-gas or the oil mist will damage or pollute the other structures of the apparatus, and pollute the external environment.

SUMMARY

At least one embodiment of the disclosure provides an oil-gas treatment system, the oil-gas treatment system includes an oil-gas separation device and a first oil-gas delivery device. The oil-gas separation device is configured to perform an oil-gas separation treatment on oil-gas generated by an oil-gas generation device, the oil-gas separation device comprises a lubrication oil box for containing lubrication oil; the first oil-gas delivery device is communicated with the lubrication oil box and is configured to convey at least a part of the oil-gas into the lubrication oil box; the lubrication oil box is configured to separate the oil-gas conveyed into the lubrication oil box, and a separated oil product is left in the lubrication oil box.

For example, in the oil-gas treatment system provided in at least one embodiment of the disclosure, the lubrication oil box is filled with lubrication oil and the first oil-gas delivery device is configured to spray the oil-gas onto a liquid surface of the lubrication oil, or the first oil-gas delivery device is configured to spray the oil-gas onto an inner wall of the lubrication oil box, or a block structure is inside the lubrication oil box, and the first oil-gas delivery device is configured to spray the oil-gas onto the block structure.

For example, in the oil-gas treatment system provided in at least one embodiment of the disclosure, the lubrication oil box is filled with lubrication oil, the first oil-gas delivery device has an outlet which is inside the lubrication oil box and is spaced apart from the lubrication oil.

For example, in the oil-gas treatment system provided in at least one embodiment of the disclosure, the outlet of the first oil-gas delivery device has a wedge-shaped opening, the wedge-shaped opening is toward the liquid surface of the lubrication oil or the block structure or the inner wall of the lubrication oil box, and the oil-gas is sprayed into the lubrication oil box through the wedge-shaped opening.

For example, the oil-gas treatment system provided in at least one embodiment of the disclosure further comprise a grid structure which is at the wedge-shaped opening, comprises a plurality of mesh holes, and is configured to allow the oil-gas to be sprayed from the first oil-gas delivery device onto the liquid surface of the lubrication oil or the block structure or the inner wall of the lubrication oil box through the plurality of mesh holes.

For example, in the oil-gas treatment system provided in at least one embodiment of the disclosure, the oil-gas is directly conveyed to the lubrication oil box from the oil-gas generation device through the first oil-gas delivery device.

For example, in the oil-gas treatment system provided in at least one embodiment of the disclosure, the oil-gas separation device comprises a plurality of cascade-connected sub oil-gas separation devices and each stage sub oil-gas separation device performs an oil-gas separation treatment on the oil-gas; the lubrication oil box serves as one of the plurality of cascade-connected sub oil-gas separation devices; the oil-gas treatment system further comprises: a gas discharge pipe, an oil mass detection module, an oil-gas return pipe, and a control module; the gas discharge pipe is in communication with a last stage sub oil-gas separation device of the plurality of cascade-connected sub oil-gas separation devices and in communication with the atmosphere; the oil mass detection module is configured to detect an oil content in gas in the gas discharge pipe; a valve inside the gas discharge pipe; the oil-gas return pipe communicates the last stage sub oil-gas separation device with at least one of the plurality of cascade-connected sub oil-gas separation devices except for the last stage sub oil-gas separation device; and the control module is configured to control the valve to be opened for discharging a gas product in the last stage sub oil-gas separation device into atmosphere through the gas discharge pipe if the oil content is less than or equal to a standard value, and is configured to control the valve to be closed, if the oil content is greater than the standard value, to return the gas product in the last stage sub oil-gas separation device into at least one of the plurality of cascade-connected sub oil-gas separation devices except for the last stage sub oil-gas separation device through the oil-gas return pipe for continuing oil-gas separation treatment.

For example, the oil-gas treatment system provided in at least one embodiment of the disclosure further comprises an oil delivery device configured to convey an oil product, separated by sub oil-gas separation device(s) of the plurality of cascade-connected sub oil-gas separation devices except for the lubrication oil box, into the lubrication oil box.

For example, the oil-gas treatment system provided in at least one embodiment of the disclosure further comprises a bottom lubrication oil box and a bottom oil delivery device; the bottom lubrication oil box is at a bottom of the oil-gas generation device and configured to lubricate the oil-gas generation device; and the bottom oil delivery device is configured to convey an oil product, separated by sub oil-gas separation device(s) of the plurality of cascade-connected sub oil-gas separation devices except for the lubrication oil box, into the bottom lubrication oil box.

For example, in the oil-gas treatment system provided in at least one embodiment of the disclosure, when the oil-gas generation device is in an operation state, an air pressure in the bottom lubrication oil box is greater than atmospheric pressure; when the oil-gas generation device is not in an operation state, the air pressure in the bottom lubrication oil box is basically equal to the atmospheric pressure; the bottom oil delivery device is a one-way oil delivery device and comprises: a bottom oil delivery pipe and a one-way valve; the bottom oil delivery pipe is configured to collect and convey the oil product; and the one-way valve is in the bottom oil delivery pipe and is configured to allow the bottom oil delivery pipe to be one-way conductive when the oil-gas generation device is not in the operation state, to control the oil product to be conveyed to the bottom lubrication oil box from the sub oil-gas separation device(s) of the plurality of cascade-connected sub oil-gas separation devices except for the lubrication oil box through the one-way valve and not to allow lubrication oil in the bottom lubrication oil box to be conveyed toward the sub oil-gas separation device(s) of the plurality of cascade-connected sub oil-gas separation devices except for the lubrication oil box through the one-way valve.

For example, in the oil-gas treatment system provided in at least one embodiment of the disclosure, the sub oil-gas separation device(s) of the plurality of cascade-connected sub oil-gas separation devices except for the lubrication oil box is(are) at a higher location in a direction of gravity than the bottom lubrication oil box.

For example, in the oil-gas treatment system provided in at least one embodiment of the disclosure, the sub oil-gas separation device(s) of the plurality of cascade-connected sub oil-gas separation devices except for the lubrication oil box comprise(s): a condensation device configured to liquefying oil in the in the oil-gas.

For example, in the oil-gas treatment system provided in at least one embodiment of the disclosure, the lubrication oil box is filled with lubrication oil, and an outlet of the oil delivery device is connected with the lubrication oil box and is below a liquid surface of the lubrication oil in the lubrication oil box.

For example, the oil-gas treatment system provided in at least one embodiment of the disclosure further comprises a later stage oil-gas separation device which is cascade-connected with the lubrication oil box, is behind the lubrication oil box in order, and is configured to perform a later stage oil-gas separation treatment on at least a part of gas product separated by the lubrication oil box.

For example, the oil-gas treatment system provided in at least one embodiment of the disclosure further comprises a filter in the gas discharge pipe, wherein gas in the gas discharge pipe enter the atmosphere after being filtered by the filter.

For example, in the oil-gas treatment system provided in at least one embodiment of the disclosure, the lubrication oil box is used as the last stage of the plurality of cascade-connected sub oil-gas separation devices, and the lubrication oil box comprises a filter which is configured to filter the gas product separated by the lubrication oil box, and filtered gas enter the atmosphere through the gas discharge pipe.

For example, in the oil-gas treatment system provided in at least one embodiment of the disclosure, the condensation device comprises a plurality of condensation tubes which are filled with condensate liquid and extend along a first direction, and the oil-gas passes across external walls of the plurality of condensation tubes; an outline shape of the external wall of each of the plurality of condensation tubes comprises a bend portion substantially extending along the first direction, and the oil-gas passes by the external walls of the condensation tubes along the first direction.

For example, in the oil-gas treatment system provided in at least one embodiment of the disclosure, the bend shape is in a shape of fold line or wave line.

At least one embodiment of the disclosure provides a mechanical apparatus, the mechanical apparatus comprises: an oil-gas generation device, a speed reducer and a work machine, and any one of the oil-gas treatment systems provided by the embodiments of the present disclosure; the oil-gas generation device comprises an engine; the engine provides power for the work machine, and the speed reducer is connected between the engine and the work machine; the lubrication oil box is configured to provide lubrication oil for at least one selected from a group consisting of the engine, the speed reducer and the work machine.

For example, in the mechanical apparatus provided in at least one embodiment of the disclosure, the engine is a turbine engine, the turbine engine comprises a combustion chamber, and the oil-gas is discharged from the combustion chamber.

For example, in the mechanical apparatus provided in at least one embodiment of the disclosure, the mechanical apparatus is a fracturing apparatus and the work machine comprises a plunger pump.

BRIEF DESCRIPTION OF THE DRAWINGS

In order to describe technical schemes in embodiments of the disclosure more clearly, a brief introduction to drawings of the embodiments will be given below. Obviously, the drawings in the following description relate only to some embodiments of the disclosure, but do not limit the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

At least one embodiment of the disclosure provides an oil-gas treatment system, the oil-gas treatment system includes an oil-gas separation device and a first oil-gas delivery device. The oil-gas separation device is configured to perform an oil-gas separation treatment on oil-gas generated by an oil-gas generation device, the oil-gas separation device comprises a lubrication oil box for containing lubrication oil; the first oil-gas delivery device is communicated with the lubrication oil box and is configured to convey at least a part of the oil-gas into the lubrication oil box; the lubrication oil box is configured to separate the oil-gas conveyed into the lubrication oil box, and a separated oil product is left in the lubrication oil box.

A detailed description of the oil-gas treatment system provided by at least one embodiment of the disclosure in combination with drawings is given below.

Figure 1:
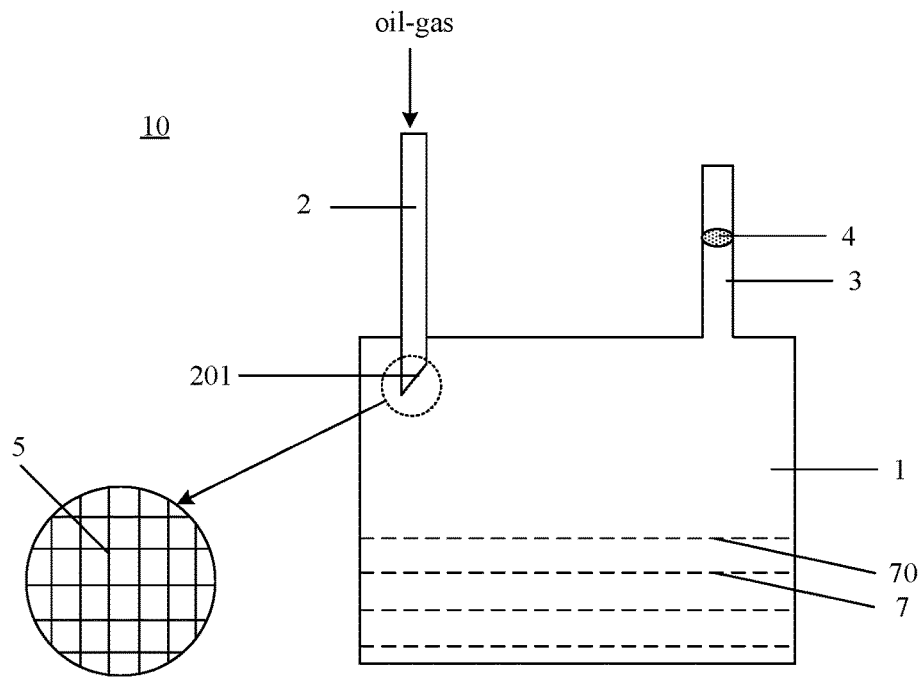
FIG. 1 is a schematic diagram of an oil-gas treatment system provided by an embodiment of the disclosure.

FIG. 1 is a schematic diagram of the oil-gas treatment system provided by at least one embodiment of the disclosure. As illustrated in FIG. 1, the oil-gas treatment system 10 comprises an oil-gas separation device which is configured to perform an oil-gas separation treatment on oil-gas generated by an oil-gas generation device. The oil-gas separation device comprises a lubrication oil box 1 for containing lubrication oil. The oil-gas treatment system 10 further comprises a first oil-gas delivery device 2 which is communicated with the lubrication oil box 1 and is configured to convey at least a part of the oil-gas into the lubrication oil box 1. The lubrication oil box 1 is configured to separate the oil-gas conveyed into it and a separated oil product is left in the lubrication oil box 1. In the oil-gas generation device, it is necessary to dispose a lubrication system comprising at least one lubrication oil box because of the need for lubricating a plurality of components. In this way, the oil-gas treatment system provided by at least one embodiment of the disclosure performs the oil-gas separation treatment of the oil-gas generated by the oil-gas generation device by using the lubrication oil box, which is easy to operate without an additional oil-gas separation device disposed, thus simplifying the structure of the oil-gas treatment system and saving the cost.

For example, the oil-gas generation device comprises an internal-combustion engine, such as an engine including a combustion chamber, fuel combusts in the combustion chamber to provide power for the operation of the engine. Therefore, a lot of oil-gas (oil mist) is generated in the combustion chamber due to the fuel combustion, which comprises gas and tiny oil droplets suspended in the gas. It is necessary to explain that the oil-gas generation device is not the lubrication oil box in the embodiments of the disclosure.

As illustrated in FIG. 1, for example, the lubrication oil box 1 is filled with lubrication oil 7 and the first oil-gas delivery device 2 is configured to spray the oil-gas onto a liquid surface 70 of the lubrication oil 7, so that the tiny oil droplets in the oil-gas accumulate and settle into the lubrication oil 7, thus achieving the oil-gas separation. For example, the first oil-gas delivery device 2 comprises an oil-gas delivery pipe.

For example, as illustrated in FIG. 1, the first oil-gas delivery device 2 has an outlet 201 located inside the lubrication oil box 1 and spaced apart from the lubrication oil in order to avoid increasing the oil content in the oil-gas due to the direct conveyance of the oil-gas into the lubrication oil, which further facilitates improving the oil-gas separation effect.

For example, the first oil-gas delivery device 2 comprises a first pipe, and the first oil-gas delivery device 2 may further comprise other structures for conveying the oil-gas which are in cooperation with the first pipe, for which common technologies in the art can be referred to and is not limited in the application.

For example, as illustrated in FIG. 1, the outlet 201 of the first oil-gas delivery device has a wedge-shaped opening toward the liquid surface 70 of the lubrication oil 7, the oil-gas is sprayed into the lubrication oil box 1 through the wedge-shaped opening. The wedge-shaped opening facilitates increasing the ejection area of the oil-gas and improving the oil-gas separation efficiency.

For example, as illustrated in FIG. 1, the oil-gas treatment system 10 further comprises a grid structure 5, the grid structure 5 is located at the position of the wedge-shaped opening and comprises a plurality of mesh holes and is configured to allow the oil-gas to be sprayed from the first oil-gas delivery device onto the liquid surface 70 of the lubrication oil 7 through the plurality of mesh holes, thus the grid structure 5 can further separate the oil mist. For example, as illustrated in FIG. 1, shapes of the mesh holes comprise rectangle; in some embodiments, shapes of the mesh holes may comprise circle, as illustrated in FIG. 2; in some embodiments, shapes of the mesh holes may also comprise diamond, irregular graphics, etc., and this is not limited in the embodiments of the disclosure.

For example, the oil-gas is conveyed directly from the oil-gas generation device into the lubrication oil box 1 through the first oil-gas delivery device 2, that is, after discharged from the oil-gas generation device, the oil-gas is conveyed into the lubrication oil box 1 through no any other structure except for the first oil-gas delivery device 2. For example, the oil-gas discharged from the combustion chamber of the turbine engine is directly conveyed into the lubrication oil box 1 through the first oil-gas delivery device 2. In this way, basically all the oil-gas can be conveyed into the lubrication oil box 1, and the lubrication oil box 1 serves as a first stage oil-gas separation device, achieving the convenient and low-cost treatment of a lot of oil-gas.

For example, the oil-gas treatment system further comprises a gas discharge pipe 3, the gas discharge pipe 3 is communicated with the lubrication oil box 1 and the atmosphere (that is, external air), and the gas product in the lubrication oil box 1 is discharged into the atmosphere through the gas discharge pipe 3. For example, a filter 4 is disposed in the gas discharge pipe 3, gas in the gas discharge pipe 3 enter the atmosphere after being filtered by the filter 4. The filter contains a substance that can absorb oil droplets and remove air pollutants such as sulfur dioxide, to further reduce the oil content in the gas product in the lubrication oil box 1 and decrease or remove the air pollutants such as sulfur dioxide in the gas product in the lubrication oil box 1, thus ensuring the quality of the gas entering into the atmosphere and reducing air pollution caused by the gas discharged from the lubrication oil box 1.

Figure 2:
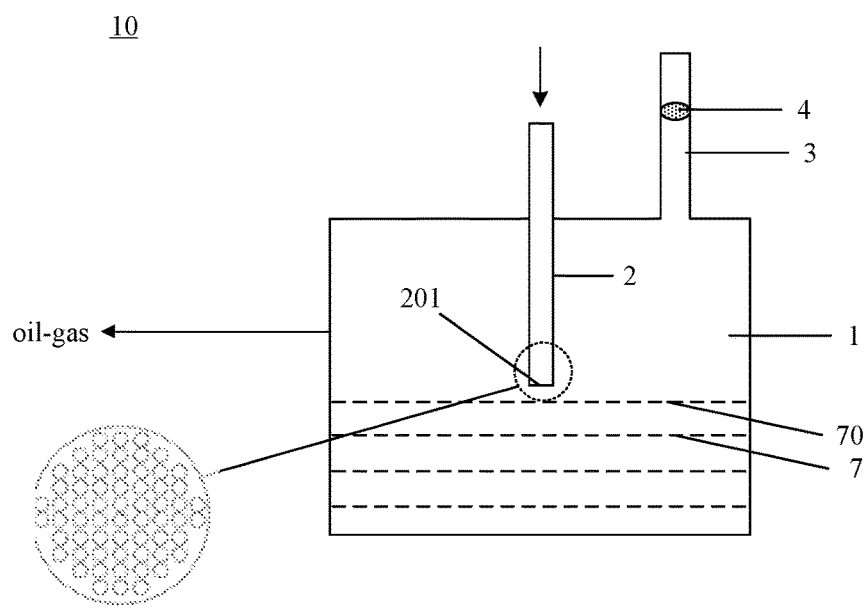
FIG. 2 is another schematic diagram of the oil-gas treatment system provided by at least one embodiment of the disclosure.

FIG. 2 is another schematic diagram of the oil-gas treatment system provided by at least one embodiment of the disclosure. The embodiment illustrated in FIG. 2 differs from that illustrated in FIG. 1 in the following aspects. The outlet 201 of the first oil-gas delivery device 2 is located inside the lubrication oil box 1, spaced apart from the lubrication oil and faces the liquid surface 70 of the lubrication oil 7, so that a lot of tiny oil droplets in the oil-gas collide on the liquid surface 70, and gather and are liquefied more quickly, thus improving the oil-gas separation efficiency. For example, in some embodiments, the outlet 201 comprises a wedge-shaped opening toward the liquid surface 70 of the lubrication oil 7. Of course, in some embodiments, the outlet 201 has a cross-section shape which is not wedge-shaped. For example, the outlet 201 of the first oil-gas delivery device 2 is spaced apart from the liquid surface of the lubrication oil 70 at a distance of less than or equal to 10 cm. The smaller distance facilitates improving the liquefying rate of a lot of tiny oil droplets on the liquid surface, thus further enhancing the efficiency and effect of the oil-gas separation. Other features and technical effects of the oil-gas treatment system illustrated in FIG. 2 are the same as those illustrated in FIG. 1, and please refer to the previous description for them.

Figure 3:
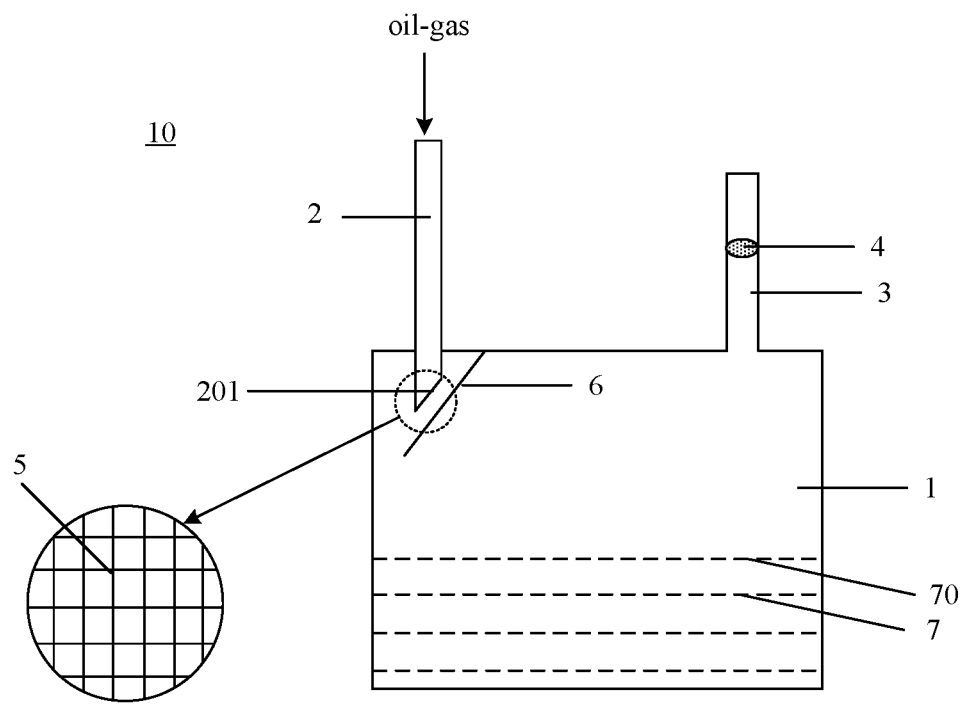
FIG. 3 is further another schematic diagram of the oil-gas treatment system provided by at least one embodiment of the disclosure.

FIG. 3 is another schematic diagram of the oil-gas treatment system provided by at least one embodiment of the disclosure. The embodiment illustrated in FIG. 3 differs from that illustrated in FIG. 1 in the following aspects. A block structure 6 is disposed inside the lubrication oil box 1 and the first oil-gas delivery device 2 is configured to spray the oil-gas onto the block structure 6, so that compared with the way of spraying the oil-gas to air in a hollow cavity, it is possible to enhance the collision of the tiny oil droplets in the oil-gas to facilitate the collection of the tiny oil droplets in the oil-gas, thus facilitating the liquification effect of the tiny oil droplets. For example, the block structure 6 is disposed on a box wall of the lubrication oil box 1. For example, in the embodiment, the block structure 6 is disposed on an upper box wall opposite to the liquid surface 70 of the lubrication oil 7. The wedge-shaped opening 201 is beneficial to guiding the oil-gas to be sprayed onto the block structure 6. For example, a pipe at an output end of the first oil-gas delivery device 2 is vertical (substantially perpendicular to the liquid surface of the lubrication oil), and the block structure 6 is oblique (intersecting with but not perpendicular to the liquid surface of the lubrication oil) and intersects with the pipe at the output end of the first oil-gas delivery device 2. For example, a surface of the block structure 6 toward the wedge-shaped opening 201 is parallel to a plane where the wedge-shaped opening 201 is located. For example, the outlet of the first oil-gas delivery device 2 faces the block structure 6. Other features and technical effects of the oil-gas treatment system illustrated in FIG. 3 are the same as those illustrated in FIG. 1, and please refer to the previous description for them.

Figure 4:
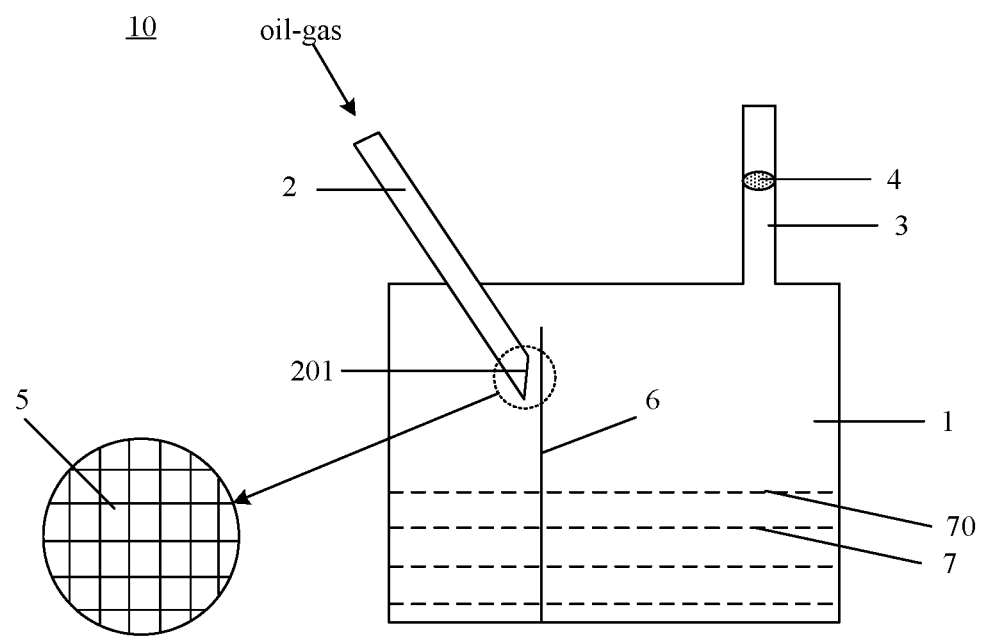
FIG. 4 is further another schematic diagram of the oil-gas treatment system provided by at least one embodiment of the disclosure.

FIG. 4 is a schematic diagram of another oil-gas treatment system provided by an embodiment of the disclosure. The embodiment illustrated in FIG. 4 differs from that illustrated in FIG. 3 in that the block structure 6 is disposed in a different way. As illustrated in FIG. 4, for example, the block structure 6 is disposed on a lower bottom wall of the lubrication oil box 1 and the lower bottom wall of the lubrication oil box 1 is covered by the lubrication oil. For example, the block structure 6 is disposed on the lower bottom wall of the lubrication oil box 1 covered by the lubrication oil and is partly immersed in the lubrication oil. The first oil-gas delivery device 2 is configured to spray the oil-gas onto the block structure 6. For example, the pipe at the output end of the first oil-gas delivery device 2 is oblique and the block structure 6 is vertical to the lower bottom wall of the lubrication oil box 1. For example, the surface of the block structure 6 toward the wedge-shaped opening 201 is parallel to the plane where the wedge-shaped opening 201 is located, so that the wedge-shaped opening 201 is beneficial to guiding the oil-gas to be sprayed onto the block structure 6. Other features and technical effects of the oil-gas treatment system illustrated in FIG. 4 are the same as those illustrated in FIG. 3, and please refer to the previous description for them.

Figure 5:
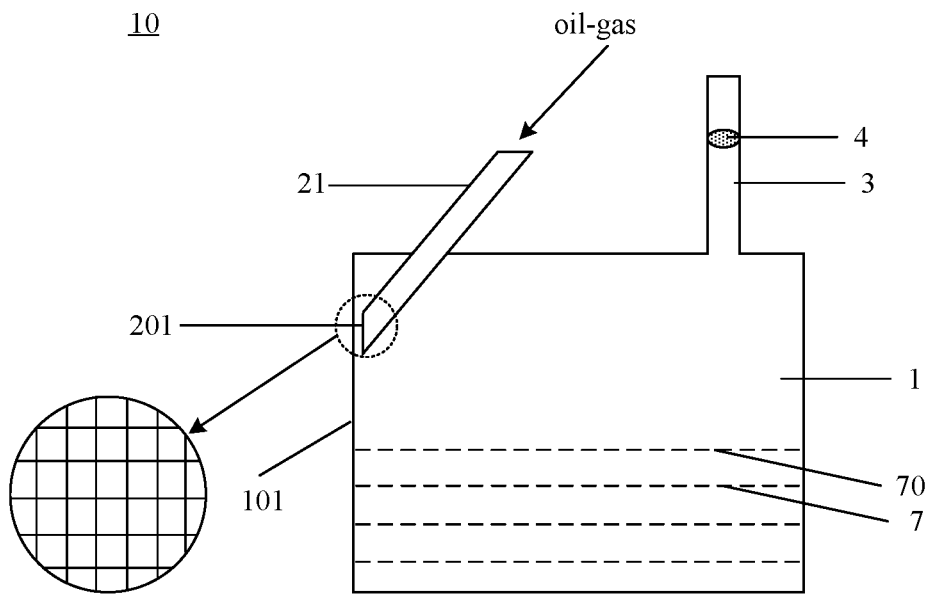
FIG. 5 is further another schematic diagram of the oil-gas treatment system provided by at least one embodiment of the disclosure.

FIG. 5 is further another schematic diagram of the oil-gas treatment system provided by an embodiment of the disclosure. The embodiment illustrated in FIG. 5 differs from that illustrated in FIG. 1 in that the first oil-gas delivery device 2 is configured to spray the oil-gas onto an inner wall 101 of the lubrication oil box 1. In this way, compared with the way of spraying the oil-gas to air in a hollow cavity, it is possible to enhance the collision of the tiny oil droplets in the oil-gas to facilitate the collection of the tiny oil droplets in the oil-gas, thus facilitating the liquification of the tiny oil droplets. For example, the outlet 201 comprises a wedge-shaped opening toward the inner wall 101 of the lubrication oil box 1. For example, the outlet of the first oil-gas delivery device 2 faces the inner wall 101 of the lubrication oil box 1, and namely the wedge-shaped opening faces the inner wall 101 of the lubrication oil box 1. Other features and technical effects of the oil-gas treatment system illustrated in FIG. 5 are the same as those illustrated in FIG. 1, and please refer to the previous description for them.

Figure 6:
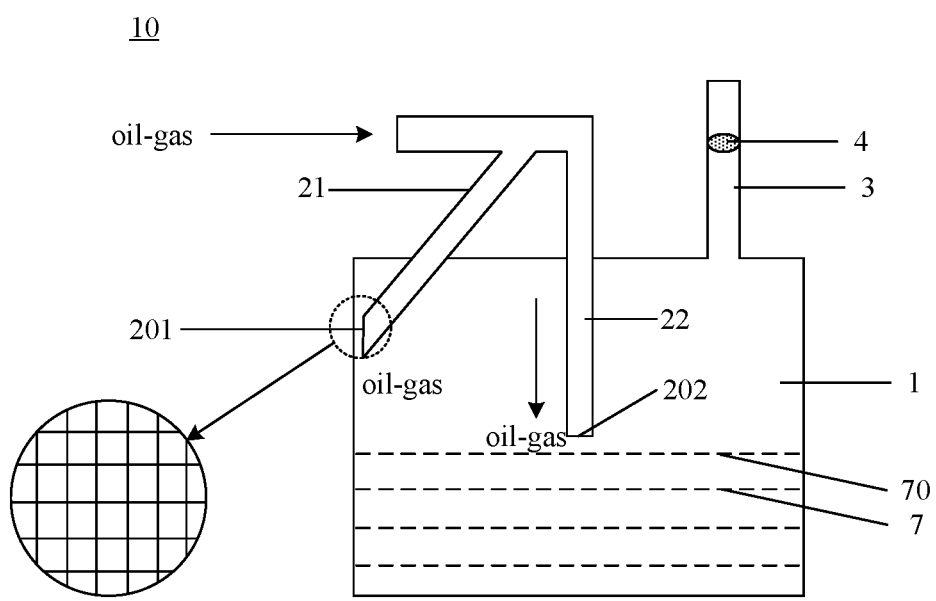
FIG. 6 is further another schematic diagram of the oil-gas treatment system provided by an embodiment of the disclosure.

FIG. 6 is further another schematic diagram of the oil-gas treatment system provided by an embodiment of the disclosure. The embodiment illustrated in FIG. 6 differs from that illustrated in FIG. 1 in that the first oil-gas delivery device 2 comprises a plurality of output pipes through which the oil-gas enter the lubrication oil box 1. For example, the first oil-gas delivery device 2 comprises a first output pipe 21 including a first outlet 201, and a second output pipe 22 including a second outlet 202. The first outlet 201 is toward the inner wall of the lubrication oil box 1, and the first output pipe 21 is configured to spray the oil-gas onto the inner wall of the lubrication oil box 1. The second outlet 202 is toward the liquid surface 70 of the lubrication oil 7 and the second output pipe 22 is configured to spray the oil-gas onto the liquid surface of the lubrication oil. In this way, it is possible to improve the efficiency of the oil-gas separation treatment and obtain the superimposed technical effects of multiple oil-gas spraying modes to achieve a better oil-gas separation effect. Other features and technical effects of the oil-gas treatment system illustrated in FIG. 6 are the same as those illustrated in FIG. 1, and please refer to the previous description for them.

For example, in some embodiments, the oil-gas separation device comprises a plurality of cascade-connected sub oil-gas separation devices, each stage sub oil-gas separation device performs the oil-gas separation treatment of the oil-gas, and the lubrication oil box serves as one of the plurality of cascade-connected sub oil-gas separation devices. For example, the oil-gas separation device further comprises an oil delivery device which is configured to convey the oil product, separated by the sub oil-gas separation device(s) of the plurality of cascade-connected sub oil-gas separation devices except for the lubrication oil box, into the lubrication oil box.

For example, the sub oil-gas separation device(s) of the plurality of cascade-connected sub oil-gas separation devices except for the lubrication oil box comprise(s) a condensation device which is configured to condense the oil-gas to liquefy the oil in the oil-gas.

Figure 7:
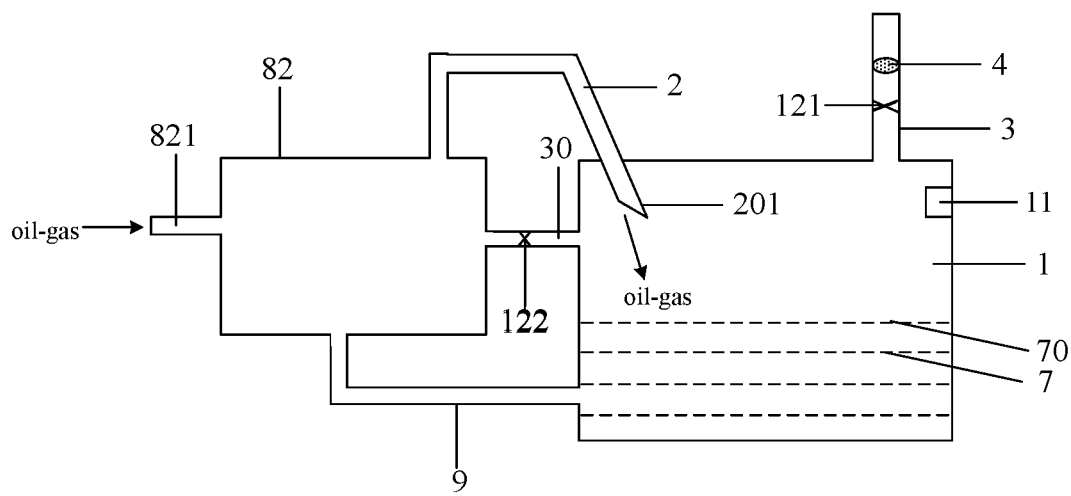
FIG. 7 is further another schematic diagram of the oil-gas treatment system provided by at least one embodiment of the disclosure.

Exemplarily, FIG. 7 is a schematic diagram of another oil-gas treatment system provided by an embodiment of the disclosure. As illustrated in FIG. 7, the sub oil-gas separation device of the plurality of cascade-connected sub oil-gas separation devices except for the lubrication oil box comprises a condensation device 82. The oil-gas generated by the oil-gas generation device is input into the condensation device 82 through a second oil-gas delivery device 821. For example, the second oil-gas delivery device 821 comprises an oil-gas delivery pipe. The condensation device 82 condense the oil-gas to liquefy the oil in the oil-gas. A gas product generated from the treatment of the oil-gas by the condensation device 82 enters the lubrication oil box 1 through the first oil-gas delivery device 2 to be performed on a next stage oil-gas separation treatment, and an oil product generated from the treatment of the oil-gas by the condensation device 82 is conveyed into the lubrication oil box 1 through an oil delivery device 9 to be recycled and be used as lubrication oil for the device such as an oil mist generation device, etc. In this way, the condensation device 82 and the lubrication oil box constitute two stage cascade-connected sub oil-gas separation devices. The lubrication oil box 1 illustrated in FIG. 7 performs the oil-gas separation in the way as described in the previous embodiments and which is not repeated here.

For example, as illustrated in FIG. 7, an outlet of the oil delivery device 9 is connected with the lubrication oil box 1, and the outlet of the oil delivery device 9 is located below the liquid surface 70 of the lubrication oil 7 in the lubrication oil box 1, that is, located on a side of the liquid surface 70 away from a space above the lubrication oil 7, in order to avoid affecting the oil content in the gas product generated from the oil-gas separation in the lubrication oil box 1.

For example, as illustrated in FIG. 7, the oil-gas treatment system 10 comprises a gas discharge pipe 3, an oil mass detection module 11, a first valve 121, an oil-gas return pipe 30 and a control module. The gas discharge pipe 3 is communicated with a last stage sub oil-gas separation device of the plurality of cascade-connected sub oil-gas separation devices and the atmosphere, and in the embodiment the last stage sub oil-gas separation device is the lubrication oil box 1. The oil mass detection module 11 is configured to detect the oil content in gas in the gas discharge pipe 3, the first valve 121 is located inside the gas discharge pipe 3, and the oil-gas return pipe 30 communicates the last stage sub oil-gas separation device (namely the lubrication oil box 1) with the condensation device 82. The control module is configured to control the first valve 121 to be opened for discharging the gas product in the last stage sub oil-gas separation device (namely the lubrication oil box 1) into the atmosphere through the gas discharge pipe 3 if the oil content in the gas in the discharge pipe 3 is less than or equal to a standard value, and the control module is configured to control the first valve 121 to be closed and control a second valve 122 located inside the oil-gas return pipe 30 to be opened if the oil content in the gas in the discharge pipe 3 is greater than the standard value, to return the gas product in the last stage sub oil-gas separation device (namely the lubrication oil box 1) into the condensation device 82 through the oil-gas return pipe 30 for continuing oil-gas separation treatment, thus forming a closed circulation system. In other embodiments, the oil-gas return pipe may also be connected to a second oil-gas delivery device 821 from the lubrication oil box 1 in order to return the gas product in the lubrication oil box 1 into the condensation device 82 for a further condensation, thus further performing the oil-gas separation treatment.

For example, the control module may be but is not limited to: a memory, a central processing unit, a single chip microcomputer, a microprocessor or a programmable logic device. It can be understood that the memory can be a volatile memory or a non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) used as an external cache. It is explained by way of examples without limitation that many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) and Direct Rambus RAM (DRRAM). The memory is intended to include but not be limited to these and any other suitable types of memory.

For example, the lubrication oil box 1 serves as the last stage of the plurality of cascade-connected sub oil-gas separation devices. Usually, the lubrication oil box 1 comprises an air pressure balance pipe, and the air pressure balance pipe is communicated with the lubrication oil box 1 and the atmosphere, and a filter is disposed inside the air pressure balance pipe. Thus, the lubrication oil box 1 serves as the last stage of the plurality of cascade-connected sub oil-gas separation devices, and can use the air pressure balance pipe as a gas discharge pipe 3 and use the filter 4 included in the lubrication oil box 1 to filter the gas product separated by the lubrication oil box 1; and the filtered gas enters the atmosphere through the gas discharge pipe. In this way, the gas discharged into the atmosphere can be further purified without an additional gas discharge pipe and filter disposed in the last stage oil-gas separation device, thus simplifying the structure and saving the cost.

Figure 8A:
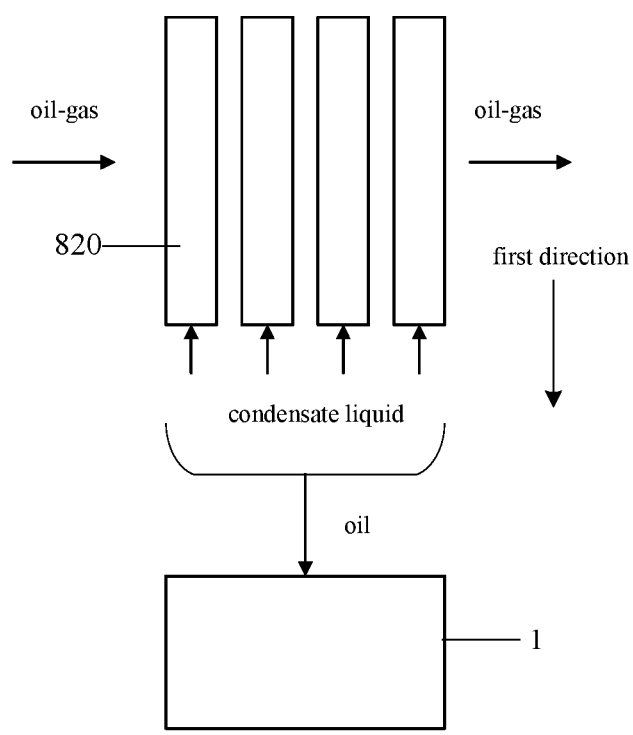
FIG. 8A is a first schematic diagram of a condensation device in FIG. 7.

FIG. 8A is a first schematic diagram of the condensation device in FIG. 7. As illustrated in FIG. 8A, the condensation device comprises a plurality of condensation tubes 820. The plurality of condensation tubes 820 are filled with condensate liquid and extend along a first direction, and the oil-gas passes by the external walls of the plurality of condensation tubes 820. The oil in the oil-gas is liquefied on the external walls of the condensation tubes, flows along the external walls of the condensation tubes to be collected into the oil delivery device 9, and then is conveyed into the lubrication oil box 1 through the oil delivery device 9. For example, the oil-gas is input in a direction vertical to the first direction and of course can also be input in other direction.

Figure 8B:
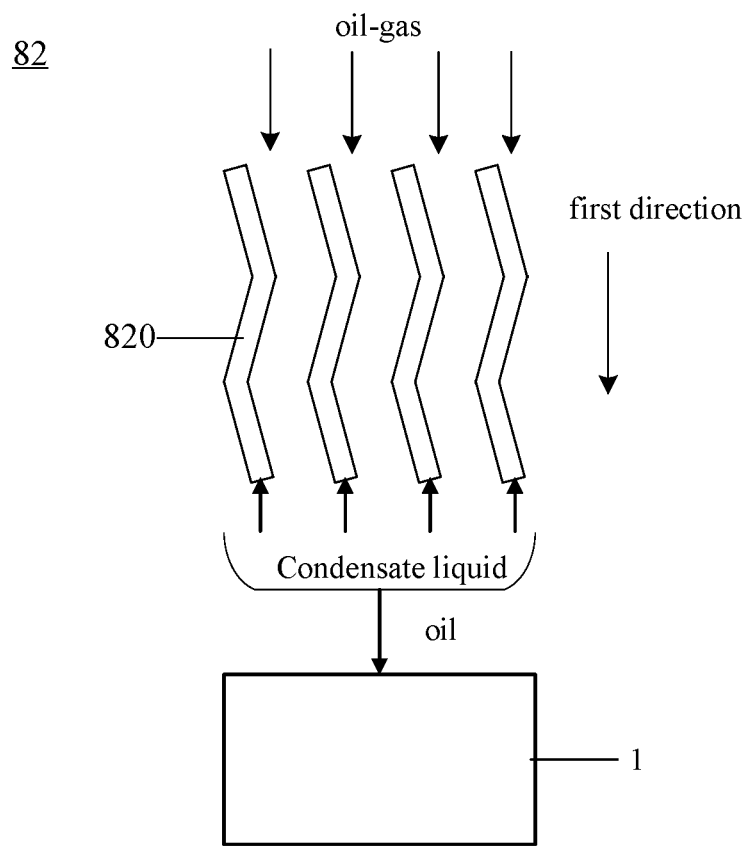
FIG. 8B is a second schematic diagram of the condensation device in FIG. 7.

FIG. 8B is a second schematic diagram of the condensation device in FIG. 7. As illustrated in FIG. 8B, each of the plurality of condensation tubes 820 have an external wall outline shape which comprises a bend portion substantially extending along the first direction, and the oil-gas passes by the external walls of the condensation tubes along the first direction. In this way, when gas flow in the oil-gas flows by the external walls of the bend portion of the plurality of condensation tubes 820, a lot of tiny oil droplets in the oil-gas collide more on the external walls of the bend portion, which facilitates increasing the liquefying rate and liquefying amount of the oil in the oil-gas, thus improving the efficiency and effect of the oil-gas separation. For example, the bend portion is in a shape of fold line. Of course, in other embodiments, the bend portion may be in other shapes such as a shape of wavy line, and this is not limited in the embodiments of the disclosure.

Figure 9:
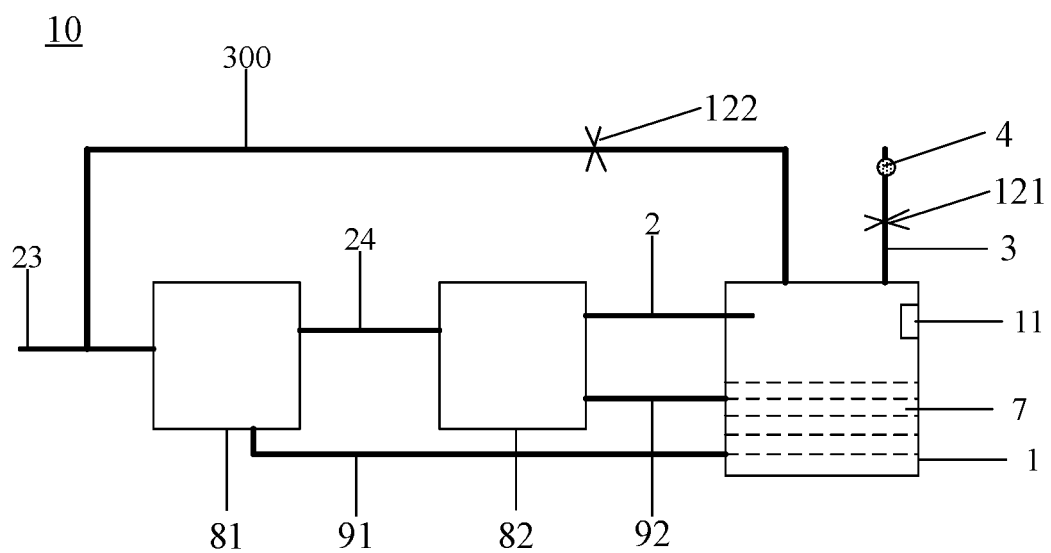
FIG. 9 is further another schematic diagram of the oil-gas treatment system provided by at least one embodiment of the disclosure.

FIG. 9 is a schematic diagram of another oil-gas treatment system provided by an embodiment of the disclosure. For example, as illustrated in FIG. 9, the oil-gas treatment system differs from that illustrated in FIG. 7 in the following aspects. On the basis of the oil-gas treatment system illustrated in FIG. 7, the plurality of cascade-connected sub oil-gas separation devices further comprise a former stage sub oil-gas separation device 81; the oil-gas is conveyed into former stage sub oil-gas separation device 81 through a third oil-gas delivery device 23, for example, the third oil-gas delivery device 23 comprises an oil-gas delivery pipe. The former stage sub oil-gas separation device 81 is configured to condense the oil-gas to liquefy the oil in the oil-gas, is cascade-connected with the condensation device 82 and is located in front of the condensation device 82 in order. A gas product, generated from the treatment of the oil-gas by the former stage sub oil-gas separation device 81, enters the condensation device 82 through a fourth oil-gas delivery device 24 to be performed on a next stage oil-gas separation. An oil product, generated from the treatment of the oil-gas by the former stage sub oil-gas separation device 81, is conveyed into the lubrication oil box 1 through a first oil delivery device 91 to be recycled and used as the lubrication oil for the device such as the oil mist generation device, etc. For example, the fourth oil-gas delivery device 24 comprises an oil-gas delivery pipe. A gas product, generated from the treatment of the oil-gas by the condensation device 82, enter the lubrication oil box 81 through a first oil-gas delivery device 2 to be performed on a next stage oil-gas separation. An oil product, generated from the treatment of the oil-gas by the condensation device 82 is conveyed into the lubrication oil box 1 through a second oil delivery device 92 to be recycled and used as the lubrication oil for the device such as the oil mist generation device, etc. An oil-gas return pipe 300 communicates the last stage sub oil-gas separation device (namely the lubrication oil box 1) with the former stage sub oil-gas separation device 81. The control module is configured to control the first valve 121 to be opened for discharging the gas product in the last stage sub oil-gas separation device (namely the lubrication oil box 1) into the atmosphere through the gas discharge pipe 3 if the oil content in the gas in the discharge pipe 3 is less than or equal to the standard value. The control module is configured to control the first valve 121 to be closed and control the second valve 122 located inside the oil-gas return pipe 30 to be opened if the oil content in the gas in the discharge pipe 3 is greater than the standard value, to return the gas product in the last stage sub oil-gas separation device (namely the lubrication oil box 1) into the former stage sub oil-gas separation device 81 through the oil-gas return pipe 300 for continuing the oil-gas separation treatment. Of course, the oil-gas return pipe 300 may communicate the last stage sub oil-gas separation device (namely the lubrication oil box 1) with the former stage sub oil-gas separation device 81 and/or the condensation device 82, that is, the oil-gas return pipe communicates the last stage sub oil-gas separation device with at least one of the plurality of cascade-connected sub oil-gas separation devices. For example, the former stage sub oil-gas separation device 81 is an oil-gas separator, and may be referred to common technologies in the art. The lubrication oil box 1 illustrated in FIG. 7 performs the oil-gas separation in the way as described in the previous embodiments and which is not repeated here.

For example, based on the oil-gas treatment system illustrated in FIG. 9, in other embodiments, the oil-gas treatment system can comprise a plurality of cascade-connected oil-gas treatment devices 81, and one oil-gas treatment device or a plurality of cascade-connected oil-gas treatment devices or condensation devices may be disposed behind the lubrication oil box 1 in order of the oil-gas separation.

In the embodiment illustrated in FIG. 7, the oil-gas treatment system comprises the former stage sub oil-gas separation device (namely the condensation device 82), the former stage sub oil-gas separation device is cascade-connected with the lubrication oil box 1 and is in front of the lubrication oil box 1 in order of the oil-gas separation. For example, in some other embodiments, the oil-gas treatment system may further comprise a later stage sub oil-gas separation device, the later stage sub oil-gas separation device is cascade-connected with the lubrication oil box 1 and is behind the lubrication oil box 1 in order of the oil-gas separation, and the later stage sub oil-gas separation device is configured to perform a later stage oil-gas separation of at least a part of gas product separated by the lubrication oil box. In this way, the lubrication oil box 1 can be used for the treatment of a lot of oil mist to reduce the burden and the treatment amount of the later stage oil gas separation device, which facilitates improving the service life of the later stage oil gas separation device and saving the cost.

Figure 10A:
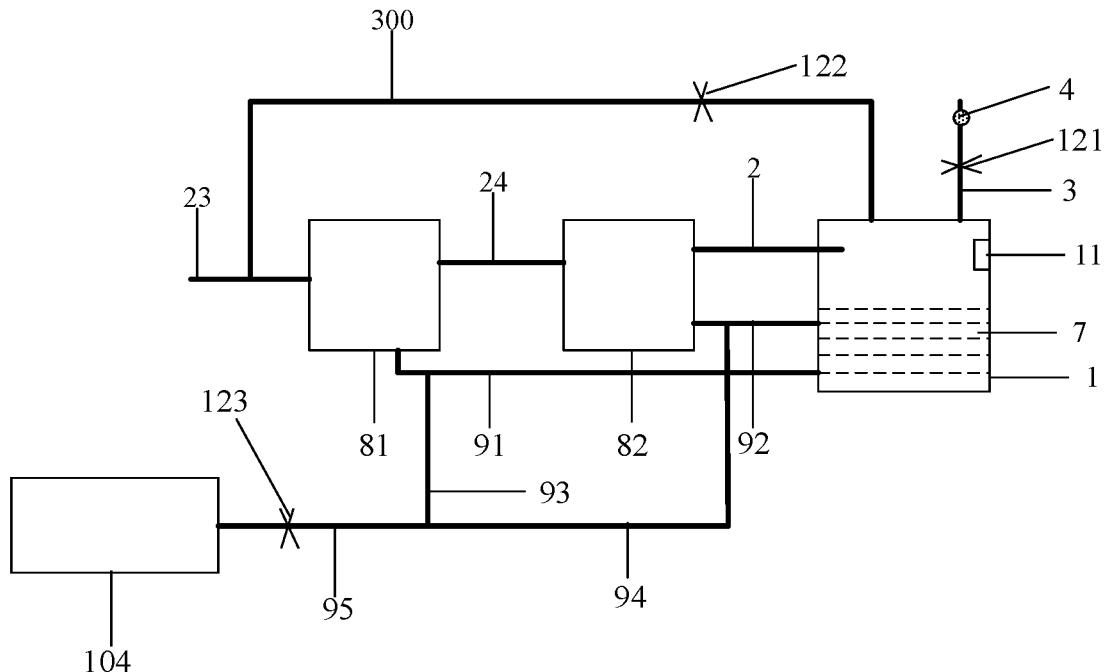
FIG. 10A is further another schematic diagram of the oil-gas treatment system provided by at least one embodiment of the disclosure.
Figure 10B:
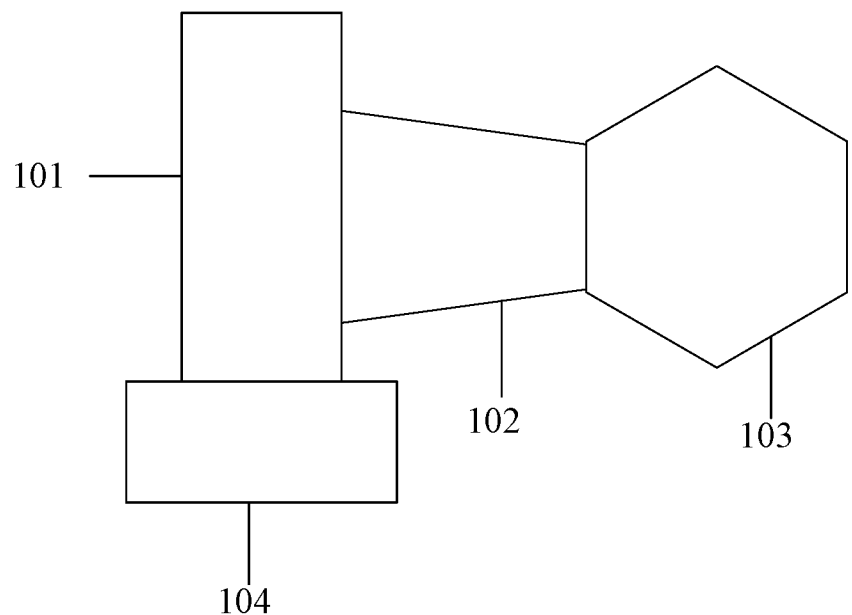
FIG. 10B is a schematic diagram of an oil-gas generation device in cooperation with a bottom lubrication oil box in FIG. 10A.

FIG. 10A is further another schematic diagram of the oil-gas treatment system provided by an embodiment of the disclosure, and FIG. 10B is a schematic diagram of the oil-gas generation device in cooperation with a bottom lubrication oil box in FIG. 10A. As illustrated in FIGS. 10A-10B, for example, the oil-gas generation device is a turbine engine. For example, the oil-gas treatment system 10 further comprises a bottom lubrication oil box 104 and a bottom oil delivery device. The bottom lubrication oil box 104 is located at a bottom of the oil-gas generation device and is filled with lubrication oil. For example, the oil-gas generation device comprises a power output module 101, an air compressor 102 connected with the power output module 101, and a combustion chamber 103 connected with the air compressor 102. For example, the combustion chamber 103 is located on a side of the air compressor 102 away from the power output module 101, and blades of the turbine engine are disposed in the combustion chamber 103. The power output module 101 is configured to transmit the power, generated by the rotation of the blades of the turbine engine in the combustion chamber 103, to a work machine. For example, the power output module 101 comprises a shaft and a bearing, and for example, the shaft is connected with a rotary disk of the blades of the turbine engine to transmit the power generated by the rotation of the blades of the turbine engine. Common technology in the art can be referred to for specific structure designs of the turbine engine which are not limited in the disclosure, and FIG. 10B is only exemplary. For example, in the embodiment illustrated in FIG. 10B, the bottom lubrication oil box 104 is located on a bottom of the power output module 101, and is configured to lubricate the oil-gas generation device, for example, lubricate components needing to be lubricated, of at least one selected from a group consisting of the power output module 101, the air compressor 102 and the combustion chamber 103, such as the above-mentioned shaft and bearings, etc. For example, the lubrication oil in the bottom lubrication oil box 104 may be conveyed to the components needing to be lubricated through a pipe. As illustrated in FIG. 10A, the bottom oil delivery device is configured to convey the oil product, separated by the sub oil-gas separation device(s) of the plurality of cascade-connected sub oil-gas separation devices except for the lubrication oil box 1, into the bottom lubrication oil box 104, to use the oil product as the lubrication oil, thus achieving the reuse of the oil product.

When the oil-gas generation device is in an operation state, the air pressure in the bottom lubrication oil box 104 is greater than the atmospheric pressure, and usually, air pressure(s) in the sub oil-gas separation device(s) of the plurality of cascade-connected sub oil-gas separation devices except for the lubrication oil box 1 is(are) in balance with the atmospheric pressure, and namely at this moment the air pressure in the bottom lubrication oil box 104 is greater than the air pressure(s) in the sub oil-gas separation device(s) of the plurality of cascade-connected sub oil-gas separation devices except for the lubrication oil box 1. When the oil-gas generation device is not in the operation state, the air pressure in the bottom lubrication oil box 104 is basically equal to the atmospheric pressure, and in this case, when the oil-gas generation device comes into the operation state, without a compelling force exerted, under the action of the air pressure difference between the bottom lubrication oil box 104 and the sub oil-gas separation device(s) of the plurality of cascade-connected sub oil-gas separation devices except for the lubrication oil box 1, the oil product cannot naturally flow into the bottom lubrication oil box 104 from the sub oil-gas separation device(s) of the plurality of cascade-connected sub oil-gas separation devices except for the lubrication oil box 1. As illustrated in FIG. 10A, for example, the bottom oil delivery device is a one-way oil delivery device and comprises bottom oil delivery pipes and a one-way valve 123. The bottom oil delivery pipes are configured to collect and convey the oil product. For example, the bottom oil delivery pipes comprise a first bottom oil delivery pipe 93, a second bottom oil delivery pipe 94 and a total bottom oil delivery pipe 95. For example, the one-way valve 123 is located in the total bottom oil delivery pipe 95 and is configured to allow the bottom oil delivery pipes to be one-way conductive when the oil-gas generation device is not in the operation state, to control the oil product to be conveyed into the bottom lubrication oil box 104 from the sub oil-gas separation device(s) of the plurality of cascade-connected sub oil-gas separation devices except for the lubrication oil box 1 through the one-way valve 123, and not to allow the lubrication oil in the bottom lubrication oil box 104 to be conveyed toward the sub oil-gas separation device(s) of the plurality of cascade-connected sub oil-gas separation devices except for the lubrication oil box 1 through the one-way valve 123, so that the lubrication oil in the bottom lubrication oil box 104 is prevented from flowing backwards to the sub oil-gas separation device(s) of the plurality of cascade-connected sub oil-gas separation devices except for the lubrication oil box 1. For example, the first bottom oil delivery pipe 93 is configured to convey the oil product in the former stage sub oil-gas separation device 81 into the bottom lubrication oil box 104, the second bottom oil delivery pipe 94 is configured to convey the oil product in the condensation device 82 into the bottom lubrication oil box 104, and the total bottom oil delivery pipe 95 collects the oil products in the first bottom oil delivery pipe 93 and the second bottom oil delivery pipe 94. In other embodiments, one-way valves may also be disposed respectively in the first bottom oil delivery pipe 93 and the second bottom oil delivery pipe 94.

For example, the sub oil-gas separation device(s) of the plurality of cascade-connected sub oil-gas separation devices except for the lubrication oil box 1, such as the former stage sub oil-gas separation device 81 and the condensation device 42, is(are) located at a higher location in the direction of gravity than the bottom lubrication oil box 104, that is, in the operation state, the sub oil-gas separation device(s) of the plurality of cascade-connected sub oil-gas separation devices except for the lubrication oil box 1 has(have) a greater height relative to the ground than the bottom lubrication oil box 104, so that when the oil-gas generation device is not in the operation state, the oil product in the sub oil-gas separation device(s) of the plurality of cascade-connected sub oil-gas separation devices except for the lubrication oil box 1, can flow into the bottom lubrication oil box 104 under the action of gravity, thus simplifying the structure of the oil-gas treatment system compared with the case that an additional power device such as an oil pump is disposed to convey the oil product into the bottom lubrication oil box 104.

For example, at least one embodiment in the disclosure further provides an oil-gas treatment method for any one oil-gas treatment system provided in the embodiments of the disclosure. The oil-gas treatment method comprises: conveying at least partly the oil-gas into the lubrication oil box; the lubrication oil box separating the oil-gas conveyed into the lubrication oil box; and leaving the separated oil product in the lubrication oil box.

For example, the lubrication oil box is filled with lubrication oil. The oil-gas treatment method further comprises: spraying the oil-gas onto a liquid surface of the lubrication oil; or the oil-gas treatment method further comprises: spraying the oil-gas onto an inner wall of the lubrication oil box; or a block structure is disposed inside the lubrication oil box, and the oil-gas treatment method further comprises: spraying the oil-gas onto the block structure.

For example, the oil-gas treatment method comprises: conveying directly the oil-gas from the oil-gas generation device to the lubrication oil box.

For example, when the oil-gas separation device comprises a plurality of cascade-connected sub oil-gas separation devices, each stage sub oil-gas separation device performs an oil-gas separation treatment of the oil-gas, and the lubrication oil box serves as one of the plurality of cascade-connected sub oil-gas separation devices. Moreover, in the case that the oil-gas treatment system 10 comprises the gas discharge pipe 3, the oil mass detection module 11, the first valve 121, the oil-gas return pipe 30 and the control module, the oil-gas treatment method further comprises: detecting an oil content in the gas in the gas discharge pipe; and judging whether the oil content reaches a discharge standard, when the oil content is less than or equal to a standard value, controlling the valve to be opened for discharging a gas product in the last stage sub oil-gas separation device into the atmosphere through the gas discharge pipe, and when the oil content is greater than the standard value, controlling the valve to be closed and returning the gas product in the last stage sub oil-gas separation device into at least one of the plurality of cascade-connected sub oil-gas separation devices for continuing the oil-gas separation treatment.

For example, the oil-gas treatment method comprises: conveying an oil product, generated in the sub oil-gas separation device(s) of the plurality of cascade-connected sub oil-gas separation devices except for the lubrication oil box, into the lubrication oil box. For example, the oil-gas treatment method comprises: condensing the oil-gas to liquefy oil in the oil-gas.

What is described in the embodiments of the oil-gas treatment systems illustrated in FIGS. 1-9 can be referred to for specific treatment methods and process flows which are not repeated. The features and technical effects in the embodiments of the oil-gas treatment systems illustrated in FIGS. 1-9 are applicable to all the protection subjects in the disclosure.

Figure 11:
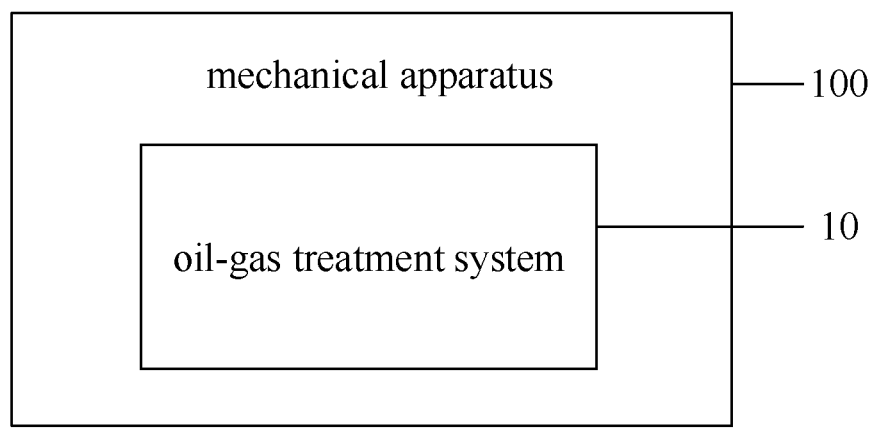
FIG. 11 is a schematic diagram of a mechanical apparatus provided by at least one embodiment of the disclosure.

At least one embodiment of the present disclosure further provides a mechanical apparatus. As illustrated in FIG. 11, the mechanical apparatus 100 comprises any one of oil-gas treatment systems provided in the embodiments of the disclosure. The mechanical apparatus 100 further comprises an oil-gas generation device, a speed reducer and a work machine. The oil-gas generation device comprises an engine which provides power for the work machine, and the speed reducer is connected between the engine and the work machine. The lubrication oil box is configured to provide lubrication oil for at least one selected from a group consisting of the engine, the speed reducer and the work machine. For example, the work machine comprises any device needing the engine to provide power for it. For example, the mechanical apparatus is a fracturing apparatus, and the work machine comprises a plunger pump. For example, in other embodiments, for example, the mechanical apparatus is a fracturing apparatus, and the work machine comprises a generator. Of course, the mechanical apparatus can also be other type of apparatus.

For example, the engine is a turbine engine which comprises a combustion chamber, the oil-gas is discharged from the combustion chamber. Of course, the engine is not limited to a turbine engine.

The following points need to be explained:
(1) The drawings of the embodiments of the disclosure only relate to structures involved with the embodiments of the disclosure, and routine designs can be referred for other structures.
(2) Technical features in the same embodiment or different embodiments of the disclosure can be combined with each other without conflict.

What is described above is only specific embodiments of the disclosure to which the protection scope of the disclosure is not limited. Variations or substitutions conceived easily by anyone who is familiar with the technical field within the technical scope disclosed in the disclosure, should fall within the protection scope of the disclosure. Thus, the protection scope of the disclosure is subject to the protection scope of claims.

The invention claimed is:
1. An oil-gas treatment system comprising:
an oil-gas separation device configured to perform an oil-gas separation treatment on oil-gas generated by an oil-gas generation device, wherein the oil-gas separation device comprises:
a lubrication oil box for containing lubrication oil; and
a plurality of sub oil-gas separation devices cascade-connected in stages, each stage being configured to perform the oil-gas separation treatment on the oil-gas, and the lubrication oil box serving as one of the plurality of sub oil-gas separation devices;
a first oil-gas delivery device which is communicated with the lubrication oil box and is configured to convey at least a part of the oil-gas into the lubrication oil box, wherein the lubrication oil box is configured to separate the oil-gas conveyed into the lubrication oil box, and a separated oil product is left in the lubrication oil box,
a gas discharge pipe in communication with a last stage of the plurality of sub oil-gas separation devices and with a discharging environment;
an oil mass detector configured to detect an oil content in the gas discharge pipe;
a valve inside the gas discharge pipe;
an oil-gas return pipe between the last stage and at least another stage of the plurality of sub oil-gas separation devices; and
a controller configured to control the valve to be opened for discharging a gas product in the last stage of the plurality of sub oil-gas separation devices into the discharging environment when the oil content is no greater than a standard value, and to control the valve to close the gas discharge pipe to the discharging environment, when the oil content is greater than the standard value, so as to facilitate a return of the gas product in the last stage to the at least another stage of the plurality of sub oil-gas separation devices through the oil-gas return pipe for additional oil-gas separation treatment.

2. The oil-gas treatment system according to claim 1, wherein
the first oil-gas delivery device is configured to spray the oil-gas onto a liquid surface of the lubrication oil in the lubrication oil box, or
the first oil-gas delivery device is configured to spray the oil-gas onto an inner wall of the lubrication oil box, or
a block structure is inside the lubrication oil box, and the first oil-gas delivery device is configured to spray the oil-gas onto the block structure.

3. The oil-gas treatment system according to claim 2, wherein the first oil-gas delivery device has an outlet inside the lubrication oil box and spaced apart from the lubrication oil.

4. The oil-gas treatment system according to claim 3, wherein the outlet of the first oil-gas delivery device has a wedge-shaped opening, the wedge-shaped opening is toward the liquid surface of the lubrication oil or the block structure or the inner wall of the lubrication oil box, and the oil-gas is sprayed into the lubrication oil box through the wedge-shaped opening.

5. The oil-gas treatment system according to claim 4, further comprising:
a grid structure which is at the wedge-shaped opening, comprises a plurality of mesh holes, and is configured to allow the oil-gas to be sprayed from the first oil-gas delivery device onto the liquid surface of the lubrication oil or the block structure or the inner wall of the lubrication oil box through the plurality of mesh holes.

6. The oil-gas treatment system according to claim 1, wherein the oil-gas is directly conveyed to the lubrication oil box from the oil-gas generation device through the first oil-gas delivery device.

7. The oil-gas treatment system according to claim 1, further comprising:
an oil delivery device configured to convey an oil product, separated by sub oil-gas separation device(s) of the plurality of sub oil-gas separation devices except for the lubrication oil box, into the lubrication oil box.

8. The oil-gas treatment system according to claim 1, further comprising:
a bottom lubrication oil box at a bottom of the oil-gas generation device and configured to lubricate the oil-gas generation device; and
a bottom oil delivery device configured to convey an oil product, separated by sub oil-gas separation device(s)

of the plurality of sub oil-gas separation devices except for the lubrication oil box, into the bottom lubrication oil box.

9. The oil-gas treatment system according to claim 8, wherein when the oil-gas generation device is in an operation state, an air pressure in the bottom lubrication oil box is greater than atmospheric pressure; when the oil-gas generation device is not in an operation state, the air pressure in the bottom lubrication oil box is basically equal to the atmospheric pressure;
the bottom oil delivery device is a one-way oil delivery device and comprises:
a bottom oil delivery pipe configured to collect and convey the oil product; and
a one-way valve which is in the bottom oil delivery pipe and is configured to allow the bottom oil delivery pipe to be one-way conductive when the oil-gas generation device is not in the operation state, to control the oil product to be conveyed to the bottom lubrication oil box from the sub oil-gas separation device(s) of the plurality of sub oil-gas separation devices except for the lubrication oil box through the one-way valve and not to allow lubrication oil in the bottom lubrication oil box to be conveyed toward the sub oil-gas separation device(s) of the plurality of sub oil-gas separation devices except for the lubrication oil box through the one-way valve.

10. The oil-gas treatment system according to claim 9, wherein the sub oil-gas separation device(s) of the plurality of sub oil-gas separation devices except for the lubrication oil box is (are) at a higher location in a direction of gravity than the bottom lubrication oil box.

11. The oil-gas treatment system according to claim 1, wherein the sub oil-gas separation device(s) of the plurality of sub oil-gas separation devices except for the lubrication oil box comprise(s):
a condensation device configured to liquefying oil in the oil-gas.

12. The oil-gas treatment system according to claim 7, wherein an outlet of the oil delivery device is connected with the lubrication oil box and is below a liquid surface of the lubrication oil in the lubrication oil box.

13. The oil-gas treatment system according to claim 1, further comprising:
a later stage oil-gas separation device which is cascade-connected with the lubrication oil box, is behind the lubrication oil box in order, and is configured to perform a later stage oil-gas separation treatment on at least a part of gas product separated by the lubrication oil box.

14. The oil-gas treatment system according to claim 1, further comprising:
a filter in the gas discharge pipe, wherein gas in the gas discharge pipe enter the discharging environment after being filtered by the filter.

15. The oil-gas treatment system according to claim 1, wherein the lubrication oil box is used as the last stage of the plurality of sub oil-gas separation devices, and
the lubrication oil box comprises a filter which is configured to filter the gas product separated by the lubrication oil box, and filtered gas enter the discharging environment through the gas discharge pipe.

16. The oil-gas treatment system according to claim 11, wherein:
the condensation device comprises a plurality of condensation tubes which are filled with condensate liquid and extend along a first direction;
the oil-gas passes across external walls of the plurality of condensation tubes;
an outline shape of the external wall of each of the plurality of condensation tubes comprises a bend portion substantially extending along the first direction; and
the oil-gas passes by the external walls of the condensation tubes along the first direction.

17. The oil-gas treatment system according to claim 16, wherein the bend portion is in a shape of fold line or wave line.

18. A mechanical apparatus comprising:
an oil-gas generation device comprising an engine;
a speed reducer and a work machine, wherein the engine provides power for the work machine, and the speed reducer is connected between the engine and the work machine; and
the oil-gas treatment system according to claim 1,
wherein the lubrication oil box is configured to provide lubrication oil for at least one selected from a group consisting of the engine, the speed reducer and the work machine.

19. The mechanical apparatus according to claim 18, wherein the engine is a turbine engine.

* * * * *